(12) United States Patent
Caldeira

(10) Patent No.: US 9,909,035 B1
(45) Date of Patent: Mar. 6, 2018

(54) MOUNTABLE ARTICLES, DUAL-ADHESIVE-ADHESIVE TAPE AND MOUNTING METHODS USING THEM

(71) Applicant: MAYAPPLE BABY LLC, Brooklyn, NY (US)

(72) Inventor: Mark Anthony Caldeira, Brooklyn, NY (US)

(73) Assignee: Mayapple Baby LLC, Brooklyn, NY (US)

( * ) Notice: Subject to any disclaimer, the term of this patent is extended or adjusted under 35 U.S.C. 154(b) by 0 days.

(21) Appl. No.: 15/720,359

(22) Filed: Sep. 29, 2017

(51) Int. Cl.
| | |
|---|---|
| B29C 65/50 | (2006.01) |
| B32B 7/12 | (2006.01) |
| B32B 9/00 | (2006.01) |
| B32B 33/00 | (2006.01) |
| B32B 37/12 | (2006.01) |
| B32B 37/26 | (2006.01) |
| B32B 38/10 | (2006.01) |
| B32B 43/00 | (2006.01) |
| C09J 7/02 | (2006.01) |

(52) U.S. Cl.
CPC .................. C09J 7/0207 (2013.01)

(58) Field of Classification Search
USPC ....... 156/71, 249, 289; 428/40.1, 41.7, 41.8, 428/42.2, 343, 352, 354, 355 R, 355 RA
See application file for complete search history.

(56) References Cited

U.S. PATENT DOCUMENTS

| | | | | |
|---|---|---|---|---|
| 3,206,238 | A | * | 9/1965 | Speight ............... E05L 313/005 192/114 R |
| 4,554,193 | A | | 11/1985 | Erickson |
| 4,699,824 | A | * | 10/1987 | Pufahl .................. H02M 3/337 428/220 |
| 4,996,092 | A | * | 2/1991 | Francis ............... B05B 15/0456 264/321 |
| 5,013,391 | A | | 5/1991 | Hutter, III et al. |
| 5,130,185 | A | * | 7/1992 | Ness ...................... C09J 7/0207 427/208 |
| 5,379,491 | A | * | 1/1995 | Solo ........................ A42B 1/247 224/901.2 |
| 5,437,428 | A | * | 8/1995 | Mirza ...................... A47G 1/17 24/683 |
| 5,445,451 | A | * | 8/1995 | Harmony ............ E05B 65/0014 292/19 |
| 5,502,516 | A | * | 3/1996 | Elterman ................. G02C 7/10 351/41 |

(Continued)

*Primary Examiner* — Sing P Chan
(74) *Attorney, Agent, or Firm* — Winston & Strawn LLP

(57) ABSTRACT

A dual-adhesive double-sided adhesive tape, having a first double-sided tape that includes a first adhesive on each side of a first support and a second double-sided tape that has a second adhesive on each side of a second support. The first double-sided tape is attached to the release layer of the second double-sided tape. This dual-adhesive double-sided adhesive tape can be simply made by joining the first double-sided tape to a release layer of the second double-sided tape. The dual-adhesive double-sided adhesive tape of the present invention is suited for use in a method of mounting an article on a working surface. The article is provided with the dual-adhesive tape with the release liner of the first tape being removed so that the article can be temporarily mounted to determine the correct location before mounting the article by the second tape.

20 Claims, 11 Drawing Sheets

(56) References Cited

U.S. PATENT DOCUMENTS

| | | | | |
|---|---|---|---|---|
| 5,533,288 A * | 7/1996 | Lambert | ............... | A47G 1/06 |
| | | | | 40/754 |
| 5,688,589 A * | 11/1997 | Schacht | ............... | B60R 13/02 |
| | | | | 428/317.3 |
| 5,725,923 A * | 3/1998 | Luhmann | ............... | A47G 1/175 |
| | | | | 206/411 |
| 5,736,470 A * | 4/1998 | Schneberger | ............... | C09J 7/04 |
| | | | | 156/295 |
| 5,824,184 A * | 10/1998 | Kamijo | ............... | B29C 63/0013 |
| | | | | 156/249 |
| 5,948,201 A * | 9/1999 | Alveskog | ............... | H02G 1/00 |
| | | | | 156/249 |
| 5,956,525 A | 9/1999 | Minsky | | |
| 6,117,531 A * | 9/2000 | Schacht | ............... | C09J 7/0246 |
| | | | | 428/213 |
| 6,129,983 A * | 10/2000 | Schumann | ............... | C08G 18/2825 |
| | | | | 427/208 |
| 6,316,073 B1 | 11/2001 | Hiscock et al. | | |
| 6,317,996 B1 | 11/2001 | Myers et al. | | |
| 6,344,252 B1 * | 2/2002 | Werner | ............... | C09J 7/00 |
| | | | | 206/411 |
| 6,432,497 B2 * | 8/2002 | Bunyan | ............... | H01L 23/36 |
| | | | | 257/712 |
| 6,451,398 B1 * | 9/2002 | Sylvester | ............... | B29C 44/06 |
| | | | | 160/40 |
| 6,554,237 B1 | 4/2003 | Weber et al. | | |
| 6,569,521 B1 * | 5/2003 | Sheridan | ............... | C09J 7/00 |
| | | | | 248/205.3 |
| 6,604,764 B2 * | 8/2003 | Zemzik | ............... | E05C 19/188 |
| | | | | 292/288 |
| 6,620,286 B2 * | 9/2003 | Werner | ............... | C09J 7/00 |
| | | | | 156/192 |
| 7,028,958 B2 * | 4/2006 | Pitzen | ............... | A47G 1/175 |
| | | | | 248/205.3 |
| 7,063,887 B2 * | 6/2006 | Kobe | ............... | C09J 7/0296 |
| | | | | 428/313.5 |
| 7,637,375 B2 * | 12/2009 | Sattel | ............... | B65D 83/0463 |
| | | | | 206/1.5 |
| 7,690,608 B2 * | 4/2010 | Huber | ............... | B42F 5/06 |
| | | | | 248/205.3 |
| 7,727,351 B2 * | 6/2010 | Keite-Telgenbuscher | ............... | C09J 133/08 |
| | | | | 156/247 |
| 7,757,843 B2 * | 7/2010 | Katsis | ............... | A24F 27/00 |
| | | | | 206/1.5 |
| 7,758,958 B2 * | 7/2010 | Takahashi | ............... | C09J 7/0217 |
| | | | | 428/214 |
| 7,815,988 B2 | 10/2010 | Stumpf et al. | | |
| 7,867,610 B2 * | 1/2011 | Takahashi | ............... | C09J 7/0217 |
| | | | | 428/214 |
| 7,985,123 B2 * | 7/2011 | Yamada | ............... | B24B 13/005 |
| | | | | 451/285 |
| 8,056,989 B2 * | 11/2011 | Zielinski | ............... | E05B 65/0014 |
| | | | | 292/84 |
| 8,202,594 B2 * | 6/2012 | Kobayashi | ............... | C09J 7/045 |
| | | | | 428/343 |
| 8,227,533 B2 * | 7/2012 | Takahashi | ............... | C09J 7/0217 |
| | | | | 524/272 |
| 8,299,156 B2 * | 10/2012 | Takahashi | ............... | C09J 7/0217 |
| | | | | 524/272 |
| 8,317,236 B2 * | 11/2012 | Hill | ............... | D06F 39/02 |
| | | | | 292/121 |
| 8,367,177 B2 * | 2/2013 | Nonaka | ............... | B32L 327/32 |
| | | | | 428/323 |
| 8,409,683 B2 * | 4/2013 | Kosaka | ............... | C09J 7/0228 |
| | | | | 428/304.4 |
| 8,436,122 B2 * | 5/2013 | Kho | ............... | B32B 17/06 |
| | | | | 528/12 |
| 8,551,594 B2 * | 10/2013 | Deiss | ............... | E04B 1/6812 |
| | | | | 428/131 |
| 8,678,452 B2 * | 3/2014 | Nagaoka | ............... | E05B 77/265 |
| | | | | 292/201 |
| 8,815,046 B2 * | 8/2014 | Himmelsbach | ............... | C09J 7/0239 |
| | | | | 156/332 |
| 9,120,955 B2 * | 9/2015 | Arimitsu | ............... | B32B 27/00 |
| 9,151,040 B2 * | 10/2015 | Coates | ............... | B32B 5/26 |
| 9,284,758 B2 * | 3/2016 | Yokomori | ............... | E05B 85/10 |
| 9,475,966 B2 * | 10/2016 | Ellringmann | ............... | B41N 6/02 |
| 9,493,680 B2 * | 11/2016 | Schumann | ............... | C09J 5/02 |
| 9,493,690 B2 * | 11/2016 | Goubard | ............... | C09J 7/0289 |
| 9,493,692 B2 * | 11/2016 | Goubard | ............... | C09J 183/14 |
| 9,598,884 B2 * | 3/2017 | Nagaoka | ............... | E05B 77/265 |
| 9,783,704 B2 * | 10/2017 | Fujii | ............... | C09J 163/00 |
| 2002/0009568 A1 * | 1/2002 | Bries | ............... | C09J 7/02 |
| | | | | 428/40.1 |
| 2002/0012762 A1 * | 1/2002 | Bunyan | ............... | H01L 23/36 |
| | | | | 428/40.2 |
| 2002/0034601 A1 * | 3/2002 | Werner | ............... | C09J 7/00 |
| | | | | 428/40.1 |
| 2003/0017331 A1 * | 1/2003 | Okochi | ............... | C08G 18/3284 |
| | | | | 428/343 |
| 2003/0034656 A1 * | 2/2003 | Zemzik | ............... | E05C 19/188 |
| | | | | 292/293 |
| 2003/0138624 A1 * | 7/2003 | Burmeister | ............... | B01J 13/02 |
| | | | | 428/343 |
| 2003/0162017 A1 | 8/2003 | Weir et al. | | |
| 2003/0170443 A1 * | 9/2003 | Kobe | ............... | C09J 7/0296 |
| | | | | 428/317.3 |
| 2003/0235672 A1 * | 12/2003 | Manteufel | ............... | B32B 7/06 |
| | | | | 428/40.1 |
| 2004/0081788 A1 * | 4/2004 | Sudofsky | ............... | C09J 7/0242 |
| | | | | 428/40.1 |
| 2004/0086710 A1 * | 5/2004 | Pitzen | ............... | A47G 1/175 |
| | | | | 428/343 |
| 2005/0023421 A1 | 2/2005 | Wood et al. | | |
| 2005/0269816 A1 * | 12/2005 | Huber | ............... | B42F 5/06 |
| | | | | 281/45 |
| 2006/0084735 A1 * | 4/2006 | Takahashi | ............... | C09J 7/0217 |
| | | | | 524/271 |
| 2006/0251890 A1 * | 11/2006 | Lane | ............... | C09J 7/0246 |
| | | | | 428/343 |
| 2006/0263596 A1 * | 11/2006 | Bamborough | ............... | B29C 47/0021 |
| | | | | 428/354 |
| 2007/0087192 A1 * | 4/2007 | Keite-Telgenbuscher | ............... | C09J 133/08 |
| | | | | 428/343 |
| 2007/0110941 A1 * | 5/2007 | Utesch | ............... | C09J 7/0207 |
| | | | | 428/40.1 |
| 2007/0113376 A1 | 5/2007 | Frushour | | |
| 2007/0125254 A1 | 6/2007 | Gartner | | |
| 2007/0131336 A1 | 6/2007 | Orlich | | |
| 2007/0184630 A1 * | 8/2007 | Cullen | ............... | H01L 21/6835 |
| | | | | 438/455 |
| 2007/0221327 A1 * | 9/2007 | Zoller | ............... | B32B 7/06 |
| | | | | 156/329 |
| 2007/0231571 A1 * | 10/2007 | Lane | ............... | B29C 47/0021 |
| | | | | 428/354 |
| 2008/0166953 A1 * | 7/2008 | Yamada | ............... | B24B 13/005 |
| | | | | 451/42 |
| 2008/0190952 A1 * | 8/2008 | Strub | ............... | B65D 5/721 |
| | | | | 221/2 |
| 2008/0217390 A1 * | 9/2008 | Sattel | ............... | B65D 83/0463 |
| | | | | 229/210 |
| 2008/0284180 A1 * | 11/2008 | Newcombe | ............... | E05B 65/0014 |
| | | | | 292/198 |
| 2009/0066203 A1 * | 3/2009 | Zielinski | ............... | E05B 65/0014 |
| | | | | 312/222 |
| 2009/0075011 A1 * | 3/2009 | Himmelsbach | ............... | C09J 7/0239 |
| | | | | 428/43 |
| 2009/0152134 A1 * | 6/2009 | Katsis | ............... | A24F 27/00 |
| | | | | 206/96 |
| 2009/0181250 A1 * | 7/2009 | Zmarsly | ............... | B29C 70/606 |
| | | | | 428/352 |
| 2009/0261697 A1 * | 10/2009 | Hill | ............... | D06F 39/02 |
| | | | | 312/333 |
| 2009/0264039 A1 * | 10/2009 | Takahashi | ............... | C09J 7/0217 |
| | | | | 442/395 |

(56) References Cited

U.S. PATENT DOCUMENTS

| | | | | |
|---|---|---|---|---|
| 2009/0272491 A1* | 11/2009 | Kobayashi | C09J 7/045 | 156/327 |
| 2010/0003441 A1* | 1/2010 | Nonaka | B32B 27/32 | 428/40.2 |
| 2010/0038023 A1* | 2/2010 | Kho | B32B 17/06 | 156/247 |
| 2010/0047548 A1* | 2/2010 | Deiss | E04B 1/6812 | 428/223 |
| 2010/0119803 A1* | 5/2010 | Kosaka | C09J 7/0207 | 428/222 |
| 2010/0224312 A1* | 9/2010 | Tsubaki | C09J 7/0232 | 156/212 |
| 2010/0239804 A1* | 9/2010 | Takahashi | C09J 7/0217 | 428/41.4 |
| 2010/0247833 A1* | 9/2010 | Takahashi | C09J 7/0217 | 428/41.4 |
| 2010/0255241 A1* | 10/2010 | Wada | C09J 7/0246 | 428/41.8 |
| 2011/0014410 A1* | 1/2011 | Kishioka | C08F 220/18 | 428/41.8 |
| 2011/0067799 A1* | 3/2011 | Mussig | A61L 15/58 | 156/94 |
| 2011/0100550 A1* | 5/2011 | Himmelsbach | C09J 7/0239 | 156/332 |
| 2011/0111563 A1* | 5/2011 | Yanagi | H01L 21/561 | 438/118 |
| 2011/0111660 A1* | 5/2011 | Morino | C09J 7/045 | 442/149 |
| 2011/0198870 A1* | 8/2011 | Nagaoka | E05B 77/265 | 292/200 |
| 2011/0244230 A1* | 10/2011 | Tsubaki | C09J 7/0207 | 428/355 AC |
| 2012/0015183 A1* | 1/2012 | Kobayashi | C09J 7/0217 | 428/354 |
| 2012/0058289 A1* | 3/2012 | Coates | B32B 5/26 | 428/41.8 |
| 2012/0082816 A1* | 4/2012 | Wada | C09J 7/0217 | 428/41.8 |
| 2012/0082817 A1* | 4/2012 | Wada | C09J 7/0217 | 428/41.8 |
| 2012/0082818 A1* | 4/2012 | Wada | C09J 7/0217 | 428/41.8 |
| 2013/0017389 A1* | 1/2013 | Tamura | C09J 133/066 | 428/314.4 |
| 2013/0029147 A1* | 1/2013 | Miki | C09J 5/06 | 428/355 CN |
| 2013/0095309 A1* | 4/2013 | Suzuki | C09J 133/08 | 428/220 |
| 2013/0142982 A1* | 6/2013 | Horiguchi | C09J 7/045 | 428/41.8 |
| 2013/0156946 A1* | 6/2013 | Wada | C09J 7/0246 | 427/208 |
| 2013/0228267 A1* | 9/2013 | Tsubaki | C09J 7/0232 | 156/163 |
| 2013/0335879 A1* | 12/2013 | Arimitsu | C09J 7/0207 | 361/301.4 |
| 2013/0344323 A1* | 12/2013 | Fujii | C09J 163/00 | 428/337 |
| 2014/0001778 A1* | 1/2014 | Yokomori | E05B 85/10 | 292/336.3 |
| 2014/0002953 A1* | 1/2014 | Arimitsu | C09J 7/0207 | 361/301.4 |
| 2014/0127501 A1* | 5/2014 | Schumann | C09J 5/02 | 428/349 |
| 2014/0154492 A1* | 6/2014 | Traser | C09J 7/00 | 428/220 |
| 2014/0255681 A1* | 9/2014 | Epple | C09J 7/0289 | 428/317.3 |
| 2014/0367974 A1* | 12/2014 | Keely | E05B 65/0014 | 292/60 |
| 2015/0030797 A1* | 1/2015 | Seo | C08J 5/18 | 428/41.8 |
| 2015/0159053 A1* | 6/2015 | Schumann | C08G 18/6674 | 428/317.3 |
| 2015/0175852 A1* | 6/2015 | Ellringmann | B41N 6/02 | 156/332 |
| 2015/0184043 A1* | 7/2015 | Goubard | C09J 7/0289 | 428/355 N |
| 2015/0184045 A1* | 7/2015 | Goubard | C09J 183/14 | 428/317.3 |
| 2015/0225614 A1* | 8/2015 | Kim | C09J 7/0289 | 428/317.3 |
| 2015/0284599 A1* | 10/2015 | Kerep | C09J 121/00 | 156/157 |
| 2015/0361307 A1* | 12/2015 | Van Wert | C09J 7/0246 | 428/317.3 |
| 2016/0040457 A1* | 2/2016 | Yokomori | E05B 85/10 | 292/201 |
| 2016/0083549 A1* | 3/2016 | Zmarsly | B29C 70/606 | 156/244.27 |
| 2016/0096980 A1* | 4/2016 | Wieneke | C09J 7/0217 | 428/355 BL |
| 2016/0244643 A1* | 8/2016 | Shibuya | C09J 7/0267 | |
| 2016/0305159 A1* | 10/2016 | Andersen | E05L 317/06 | |
| 2017/0029666 A1* | 2/2017 | Kerep | C09J 121/00 | |
| 2017/0058149 A1* | 3/2017 | Goad | B05D 1/02 | |
| 2017/0058165 A1* | 3/2017 | Goubard | C09J 183/14 | |
| 2017/0058166 A1* | 3/2017 | Goubard | C09J 7/0289 | |
| 2017/0130487 A1* | 5/2017 | Andersen | E05L 315/022 | |
| 2017/0218231 A1* | 8/2017 | Suzuki | C09G 1/02 | |
| 2017/0275928 A1* | 9/2017 | Kozlowski | E05B 65/0014 | |

* cited by examiner

MOUNTABLE ARTICLES, DUAL-ADHESIVE-ADHESIVE TAPE AND MOUNTING METHODS USING THEM

FIELD OF THE INVENTION

The invention addresses a method of alignment and mounting of an article using dual-adhesive-adhesive tape and a method of making the dual-adhesive-adhesive tape.

BACKGROUND OF THE INVENTION

When mounting an article to a surface by using a strong adhesive tape combination, there may be instances where the article is misaligned and the strong adhesive tape cannot be easily or neatly removed once mounted. This may result in a messy residue and the need to use a new article and strong adhesive tape combination with the chance of misalignment happening again without a way to do a pre-installment of the article on the surface.

Many documents describe using double-sided adhesive tape to adhere articles together. These double-sided tapes generally have adhesives of approximately the same peel strengths on each side of the tape. In some cases, the adhesive strength is selected so that the tape is removable. One such example is described in U.S. Pat. No. 5,956,525. This system discloses using adhesive tape to adhere measuring tape to clothing.

An example of an existing composite tape having adhesives of different strengths is described in U.S. Pat. Pub. 2003/0162017. The composite tape includes two polymers, one having a relatively low peel strength in combination with an adhesive and the other having a relatively high peel strength in combination with an adhesive. The composite tape may comprise a variety of polymers with varying peel strengths. This of course makes it easier to remove and align mounted articles as the low peel strength does not adhere well to the substrate surface, but it also does not obtain the high bonding strength needed to securely retain the article on the surface during use.

Accordingly, there exists a need for a more accurate alignment and adhesive mounting system that is can be easily installed and that allows for re-alignment but that after achieving proper alignment provides a secure bond of the article to the surface or substrate to which it is to be attached. The present invention now satisfies this need.

SUMMARY OF THE INVENTION

The present invention provides a number of new and useful embodiments, including a dual-adhesive double-sided adhesive tape for mounting articles, articles that include two dual-adhesive double tapes having different adhesive strengths and which are pre-installed for easy mounting, as well to methods of mounting articles and methods for making the dual-adhesive double-sided tape. These features facilitate the mounting of articles and eliminate the dependency on physical templates that are usually required to properly position an article before permanent installation.

The dual-adhesive double-sided adhesive tape includes a first double-sided tape that includes a first adhesive on each side of a first support and a second double-sided tape that has a second adhesive on each side of a second support. One side of first double-sided tape is attached to the second double-sided tape, which the other side has a release layer thereon. Both sides of the second double-sided tape have a release layer thereon with the first double-sided tape adhered to one of the release layers. Generally, at least the side of the second double-sided tape that is not adhered to the first double-sided tape has (a) an adhesive strength that is greater than that of the adhesive on the first side of the first double-sided tape, (b) a greater amount of adhesive than that of the adhesive on the first side of the first double-sided tape, or (c) a larger area of adhesive coverage than that of the adhesive on the first side of the first double-sided tape. This allows the first adhesive tape to provide a temporary mounting that can be removed without removing the second double-sided tape from the article to be mounted. Thus, the first double-sided tape is smaller in size, typically in width, than the second double-sided tape but they can be of the same size or width if desired with the second double-sided tape having more or a stronger adhesive.

This dual-adhesive double-sided adhesive tape can be simply made by obtaining the first and second tapes each with release layers on each side of the tape, and by joining the first double-sided tape to one of the release layers of the second double-sided tape after removing one of the release liners from the first double-sided tape. Generally, the tapes are wound on rolls of the desired length which is the same length as each of the first and second double-sided tapes.

The dual-adhesive double-sided adhesive tape of the present invention is ideally suited for use in a method of mounting an article on a working surface especially where a precise location is necessary for installation. The dual-adhesive double-sided adhesive tape may be cut to the desired size that corresponds to the size of the article to be mounted on a surface or substrate, such as a door or wall. The release liner on the back side of the second double-sided tape is then removed so that the dual-adhesive tape can be mounted on the article. Next, the article may be temporarily mounted on the surface or substrate by removing the release layer from the first side of the first tape, and mounting the article in a location on the surface or substrate via the exposed adhesive. After the article is correctly located, a desired mounting location for the article is marked based on the final temporary mounting. Thereafter, the release layer and first double-sided tape that are mounted on the second tape are removed, exposing the adhesive on the first side of the second double-sided tape. Finally, the article is mounted in the desired mounting location by contacting that location with the adhesive on the first side of the second double-sided tape.

The invention also provides an article to be mounted on a working surface comprising a body member having a mounting surface and two double-sided adhesive tapes thereon. The first double-sided tape comprises a support that has first and second sides each coated with an adhesive, with the adhesive on the first side including a release liner. The second double-sided tape comprises a support that has first and second sides each coated with an adhesive, with the adhesive on the second side of the second double-sided tape (a) an adhesive strength that is greater than that of the adhesive on the first side of the first double-sided tape, (b) a greater amount of adhesive than that of the adhesive on the first side of the first double-sided tape, or (c) a larger area of adhesive coverage than that of the adhesive on the first side of the first double-sided tape. The second double-sided tape is attached to the mounting surface of the body member of the article with the adhesive on the second side of the second double-sided adhesive tape attached to the mounting surface. Also, the first double-sided tape is attached to the second double-sided tape with the adhesive on the second side of the first double-sided tape attached to the release liner on the adhesive on the first side of the second double-sided tape. This provides an article that is ready for temporary mounting just by removing the release liner from the first tape.

For all embodiments, it is typical to use pressure sensitive adhesives, with the adhesives on each side of the first double-sided tape being the same and having the same adhesive strength. Also, the pressure sensitive adhesives on each side of the second double-sided tape are the same and have the same adhesive strength. Advantageously, the adhesive strength of the adhesive on the second side of the second double-sided tape is greater by at least 20% as measured by surface energy compared to that of the adhesive on the first side of the first double-sided tape. Furthermore, the most preferred adhesive on the first side of the first double-sided tape is a silicone adhesive, the most preferred adhesive on the second side of the second double-sided tape is an acrylic based adhesive, and the support of the second double-sided tape preferably includes an acrylic foam layer.

BRIEF DESCRIPTION OF THE DRAWINGS

The accompanying drawings are incorporated into and form a part of the specification to illustrate the preferred embodiments of the present invention. Various advantages and features of the invention will be understood from the following detailed description taken in connection with the appended claims and with reference to the attached drawing figures in which:

DETAILED DESCRIPTION OF THE INVENTION

Figure 1A:
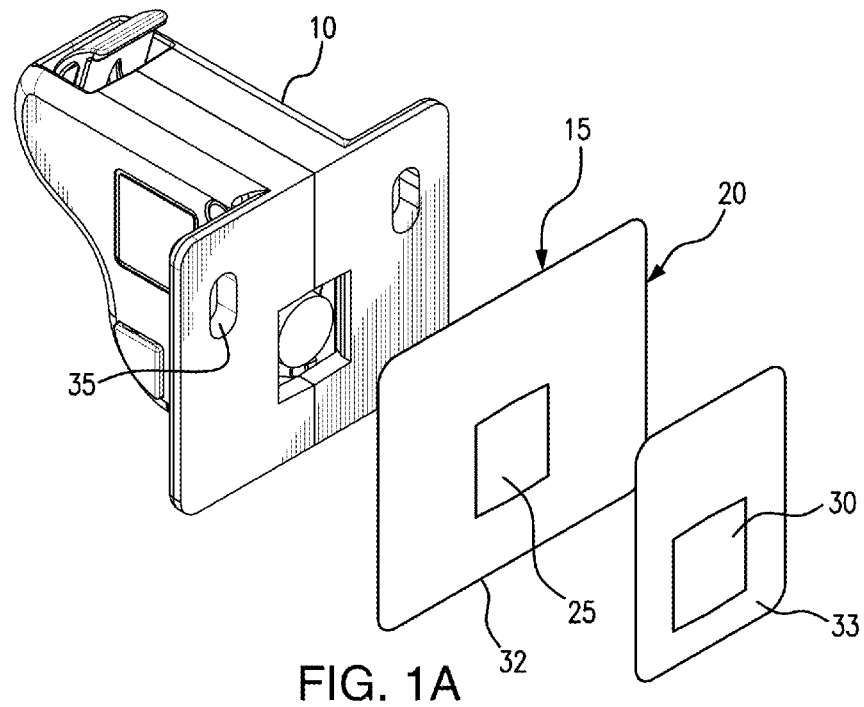
FIGS. 1A and 1B are exploded perspective views of an embodiment wherein latch and catch articles to be mounted on a cabinet are provided with dual-adhesive adhesive tapes according to the present invention.

Preferred embodiments of the present invention will now be described with reference to various examples of how the invention can best be made and used. The technical features described in this application can also be used to construct various systems and methods not described here. It will be apparent to a person of ordinary skill in the art, however, that the present invention may be practiced in other embodiments that depart from these specific details.

The double-sided tapes of the present invention preferably include a pressure sensitive adhesive on each side but a skilled artisan would realize that for certain applications other adhesives can be used. The invention teaches that the initial adhesive is used for temporary mounting of the article and for that reason is not intended to be sufficiently strong to provide a permanent bond, while the second tape is used for providing a semi-permanent or permanent bond after the correct mounting position for the article is attained. When a semi-permanent bond is provided, the user is allowed to eventually remove the mounted article, although with greater force and difficulty than that used for the first tape. The exemplary embodiment is of a dual-adhesive double-sided pressure sensitive adhesive tape in particular for mounting lock and catch articles of a cabinet locking system.

As disclosed herein, the dual-adhesive doubled sided pressure sensitive tape of the invention comprises a first double-sided tape comprising a support that has first and second sides each coated with a pressure sensitive adhesive, and with the adhesive on the first side including a release layer or liner; and a second double-sided tape comprising a support that has first and second sides each coated with a pressure sensitive adhesive, with each adhesive including a release layer or liner and with the adhesive on the second side of the second double-sided tape having an adhesive strength that is greater than that of the adhesive on the first side of the first double-sided tape. The dual-adhesive doubled sided tape has the adhesive on the second side of the first double-sided tape attached to the release liner on the adhesive on the first side of the second double-sided tape.

This tape is ideally suited for use in a method of mounting an article on a working surface as noted especially where a precise location is necessary for installation. The dual-adhesive double-sided pressure sensitive adhesive tape disclosed herein is first cut to the desired size to conform to the size of the part or article to be mounted. Thereafter, the second release liner of the second tape is removed and the adhesive on the second side of the second double-sided tape is attached to the mounting surface of the article.

Next, the release liner is removed from the adhesive on the first side of the first double-sided tape to expose the adhesive on that first side. This facilitates the temporary mounting of the article on a placement location on the working surface by simply contacting the working surface with the adhesive on the first side of the first double-sided tape. The article can be moved or adjusted to a better location to fine tune the installation and to provide the article in the best position. For example, to mount a hook for holding a picture, the temporary location can be adjusted until the picture is centered on a wall or when two hooks are used, the temporary locations can be varied until the picture is aligned straight. For mounting components of a latch, the temporary positions can be varied or adjusted for proper operation and engagement of the catch and lock.

After the a desired mounting location for the article based on the temporary mounting of the article is determined, the first release liner of the second tape, along with the first double-sided tape, are removed from the adhesive on the first side of the second double-sided tape. As the first double-sided tape is no longer needed, it can be discarded.

Finally, the article is mounted in the desired mounting location by contacting that location with the adhesive on the first side of the second double-sided tape.

Preferably, each adhesive on the sides of the second double-sided tape has an adhesive strength that is greater than that of the adhesive on the first side of the first double-sided tape. This results in a very secure bond both to an article or part to which the tape is attached as well as to a surface or substrate to which the article or part is to be attached or mounted.

For certain embodiments, the adhesive on the second side of the first double-sided tape may have an adhesive strength that is greater than the adhesive on the first side of the first double-sided tape. This allows the article to be temporarily mounted by the first tape such that the first tape is more securely mounted to the second tape. This allows the temporary mounting to be moved without the first tape sticking more strongly to the surface or substrate than to the second tape, even when multiple temporary mountings are made.

For convenience, the adhesives on each side of the second double-sided tape may be the same and have the same adhesive strength. Preferably, the adhesive strength of the adhesive on the second side of the second double-sided tape is greater by at least 20% as measured by surface energy compared to that of the adhesive on the first side of the first double-sided tape. Also, the adhesive on the first side (or on both sides) of the first double-sided tape is preferably a silicone adhesive. In contrast, the adhesive on the second side (or on both sides) of the second double-sided tape is preferably an acrylic based adhesive.

To assist in mounting the articles, the tape supports preferably include a foam layer that allows compression. In particular, the support of the second double-sided tape preferably includes an acrylic foam layer.

In this dual-adhesive double-sided tape of the invention, the first tape is often referred to as the Starter Tape or Initial Tape as it is only used for temporary mounting on a surface or substrate in order to determine the correct mounting location. The second tape is referred to as the Stronger Tape or Permanent Tape as that is used to firmly bond the article to the surface or substrate after the correct location is determined. And screws can be used to further and more securely hold the article in place after it is mounted to the surface or substrate with the second tape.

The invention also includes a method of making dual-adhesive double-sided pressure sensitive adhesive tape. This method includes providing a first double-sided tape having a support that has first and second sides each coated with a pressure sensitive adhesive, and with the adhesive on the first side including a release liner; providing a second double-sided tape comprising a support that has a first and second sides each coated with a pressure sensitive adhesive, with the adhesive on the first side of the second double-sided tape including a release liner and with the adhesive on the second side of the second double-sided tape having an adhesive strength that is greater than that of the adhesive on the first side of the first double-sided tape; and adhering the adhesive on the second side of the first double-sided tape to the release liner on the adhesive on the first side of the second double-sided tape.

The two doubled sided tapes can be provided on rolls which are combined after one of the release liners of the first double-sided tape is removed and the exposed pressure sensitive adhesive contacts a release liner of the second tape. This can be easily accomplished by unwinding rolled first and second double-sided tapes, contacting the first tape to the second as noted and then re-winding or re-rolling the combined tape together. The final rolled tape can be forwarded to users.

It is also possible to instead provide the two double-sided tapes cut to their appropriate sizes for application to the mounting surface of the article by the user. The user can remove the backing or release liner from the Starter Tape and apply it to the Stronger Tape for later application to the article to be mounted. Alternatively, the cut Stronger Tape can first be applied to the article followed by the application of the Starter Tape onto the release layer of the Stronger Tape.

In another embodiment, a single dual-adhesive tape that is cut to the desired size can be provided with the Starter Tape mechanically stuck onto the second Stronger Tape with each tape having a backing or release layer on the outer sides. This dual-adhesive double-sided tape product would be a two-layered adhesive where all sides of both tapes would have release liners attached except for the second side of the first double-sided tape which is always attached to the release liner on the first side of the second double-sided tape. Then, the release liner would be removed from the second side of the second double-sided tape so that it can be applied to the mounting surface of the article.

The cut sizes of tapes can be provided in strips of varying sizes or stand-alone pieces. In some circumstances, these are actually preferred to rolls of the dual-adhesive tape as the coiling may tend to loosen the adhesion between layers for certain sizes.

The pressure sensitive adhesive of the first tape has a low peel strength as evidenced by a low surface energy, while the pressure sensitive adhesive of the second tape has a high peel strength as evidenced by a high surface energy. This facilitates the initial temporary mounting before removal of the first tape and mounting of the article with the adhesive of the second tape. The second tape providing the higher strength adhesive enables a very secure bond to be obtained when finally mounting the article.

A first doubled sided tape has the pressure sensitive adhesive as an acrylic adhesive or a silicone adhesive. The tape has a thickness of 0.08 mm but greater thicknesses to as high as 0.12 mm can be used if desired. It has a service temperature range of from −10° C. to about 60° C. The adhesive has the following properties:

Holding Power: (1 kg/in$^2$) at least 2 hours
Initial Tack (KG) 1.5
Adhesive To steel (N/25 mm) 12
Elongation (%) 103

A preferred second double-sided tape is Acrylic Foam Tape 4229P available from 3M. This tape has high performance acrylic adhesives along with an acrylic foam core that has unique viscoelastic properties that allow it to elongate and relax when put under load, thereby minimizing stress on the adhesive bond line. These properties allow the tape to bond more effectively to a wide variety of surfaces. The tape has a thickness of 0.76 mm and the following properties:

1. Breakaway and Continuing Peel 72 hrs. at 22° C. (72° F.)

Breakaway Peel: 8.6 kg (19 lbs.)
   Continuing Peel: 4.1 kg (9 lbs.)

Breakaway and Continuing Peel tests are run with 12.7 mm (0.5 in.) wide tape on PVC test bars. Tests were run on base coat/clear coat paint at a separation rate of 305 mm/min. (12 in./min.).

2. Static Shear: Exceeds 100 hours at 70° C. (158° F.). Static shear tests are run with 12.7 mm (0.5 in.) wide by 50.8 mm (2 in.) long tape on PVC test bars. 6.8 kg (15 lbs.) roll-down against stainless steel. Static weight is 250 gm (0.55 lbs.).

And for many different articles to be mounted, it is preferable to attach the first and second tapes onto a mounting surface of the article. This can be done either by using the dual-adhesive double-sided tape of the invention or by first attaching one of the adhesives on one side of the Stronger Tape to the article after removing its release layer, followed by attaching the Starter Tape to the Stronger Tape by attaching one of the adhesives on one side of the Starter Tape to the release liner of the Stronger Tape that is already adhered to the mounting surface of the article. This is easily done by removing one of the release liners of the Starter tape and then adhering the exposed adhesive to the release liner of the Stronger Tape.

To promote a further understanding of the principles of the present invention, reference will now be made to the embodiments illustrated in the drawings, and specific language will be used to describe the same. However, no limitation of the scope of this disclosure is intended.

Figure 1B:
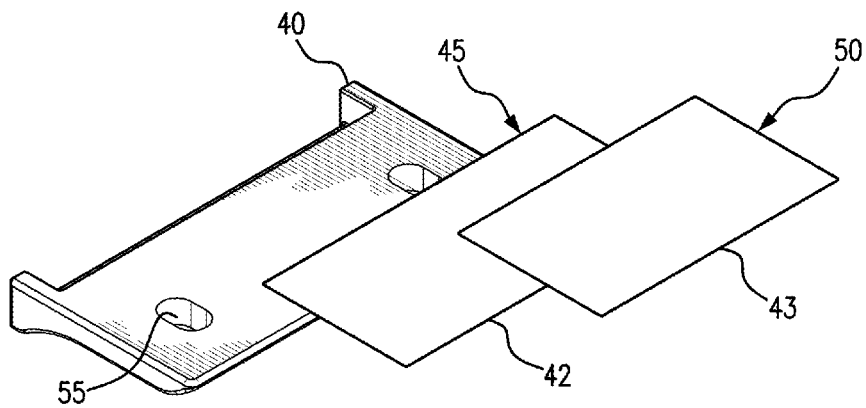

Referring now to FIGS. 1A and 1B, exploded perspective views of an embodiment of the present invention are provided in particular showing two articles that need to be mounted in positions where they can cooperate by one article engaging another. One article is a latch article 10 that is mounted on a door of a cabinet that is to be secured against access by a child. This latch article 10 which engages a catch article 40 to secure the cabinet door in a closed position. The latch article 10 includes a magnet therein such that it can be opened by applying a magnet mounted on a ring key on the outside of the door opposite the latch article 10 when access to the cabinet is desired. These articles 10, 40 each include dual-adhesive double-sided adhesive tapes according to the present invention to assist in mounting of those articles in the appropriate positions where they can properly engage each other.

In FIG. 1A, a latch article 10 including dual-adhesive adhesive tapes having a high peel strength layer 15 and a low peel strength layer 20 each including release layers 33 and openings 25, 30 is shown. In some embodiments, the latch article 10 may include mounting holes 35 therein. FIG. 1B shows a catch article 40 including dual-adhesive adhesive tapes having a high peel strength layer 45 and a low peel strength layer 50 each including release layers 43. In some embodiments, the catch article 40 may include mounting holes 55 so that after mounting screws can be used to more securely retain the article in position.

Figure 2:
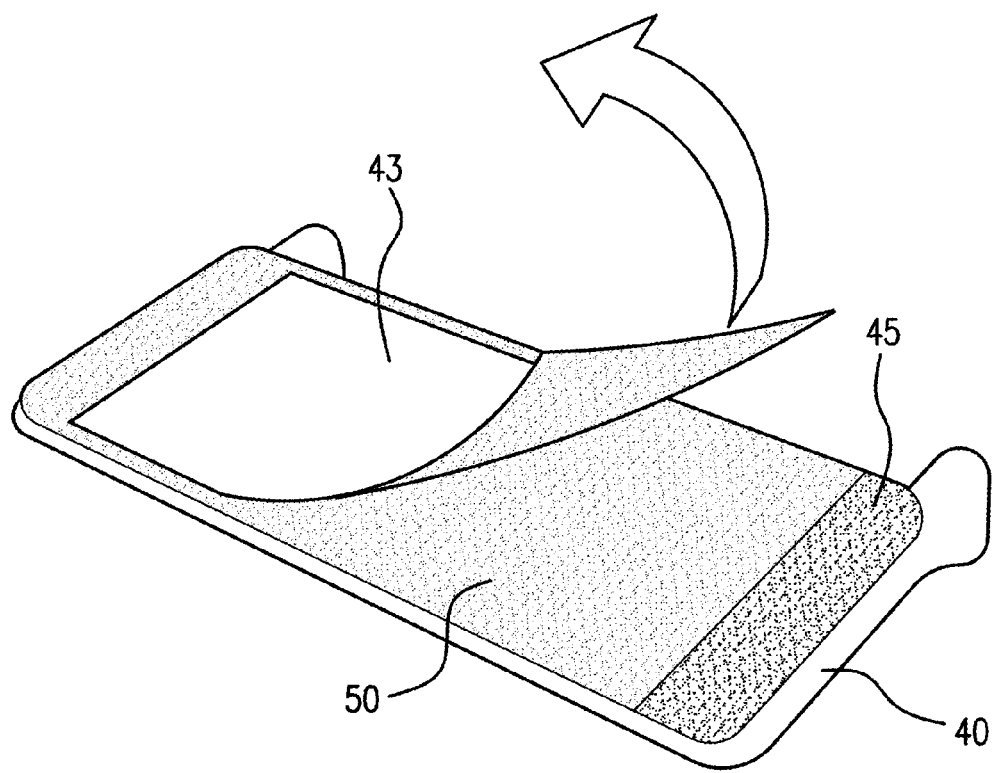
FIG. 2 is a perspective view of a catch article illustrating the removal of a release layer of a first dual-adhesive adhesive tape layer according to certain embodiments of the disclosure.

FIG. 2 is a perspective view of a catch article 40 illustrating the removal of a release layer 43 of the low peel strength adhesive layer 50 of the Starter Tape according to certain embodiments of the disclosure. In FIG. 2, the release layer 43 may be removed from the Starter Tape of catch 40 to expose the low peel strength layer 50 disposed on top of the high peel strength layer 45 and apart from catch 40.

Figure 3:
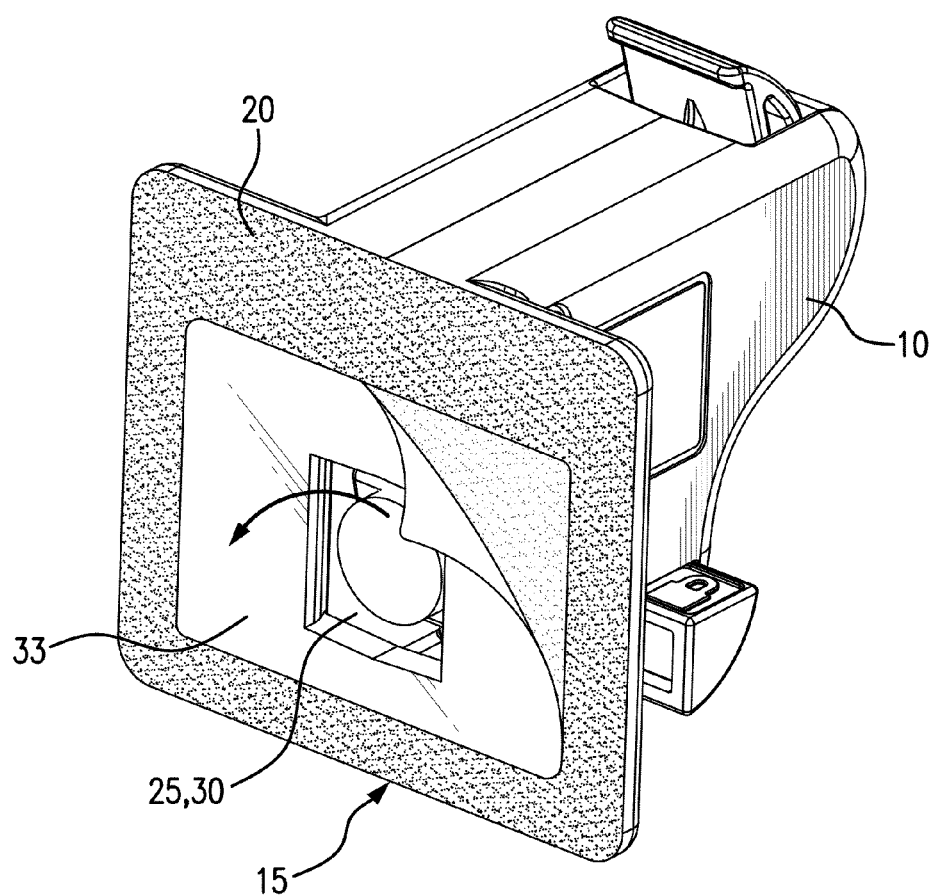
FIG. 3 is a perspective view of a latch article illustrating the removal of a release layer of a first dual-adhesive adhesive tape according to certain embodiments of the disclosure.

FIG. 3 is a perspective view of a latch article 10 illustrating the removal of a release layer 33 of the low peel strength layer 20 of the Starter Tape according to certain embodiments of the disclosure. In FIG. 3, the release layer 33 may be removed from latch 10 to expose the low peel strength layer 20 disposed on top of the high peel strength layer 15 and apart from latch 10.

Figure 4:
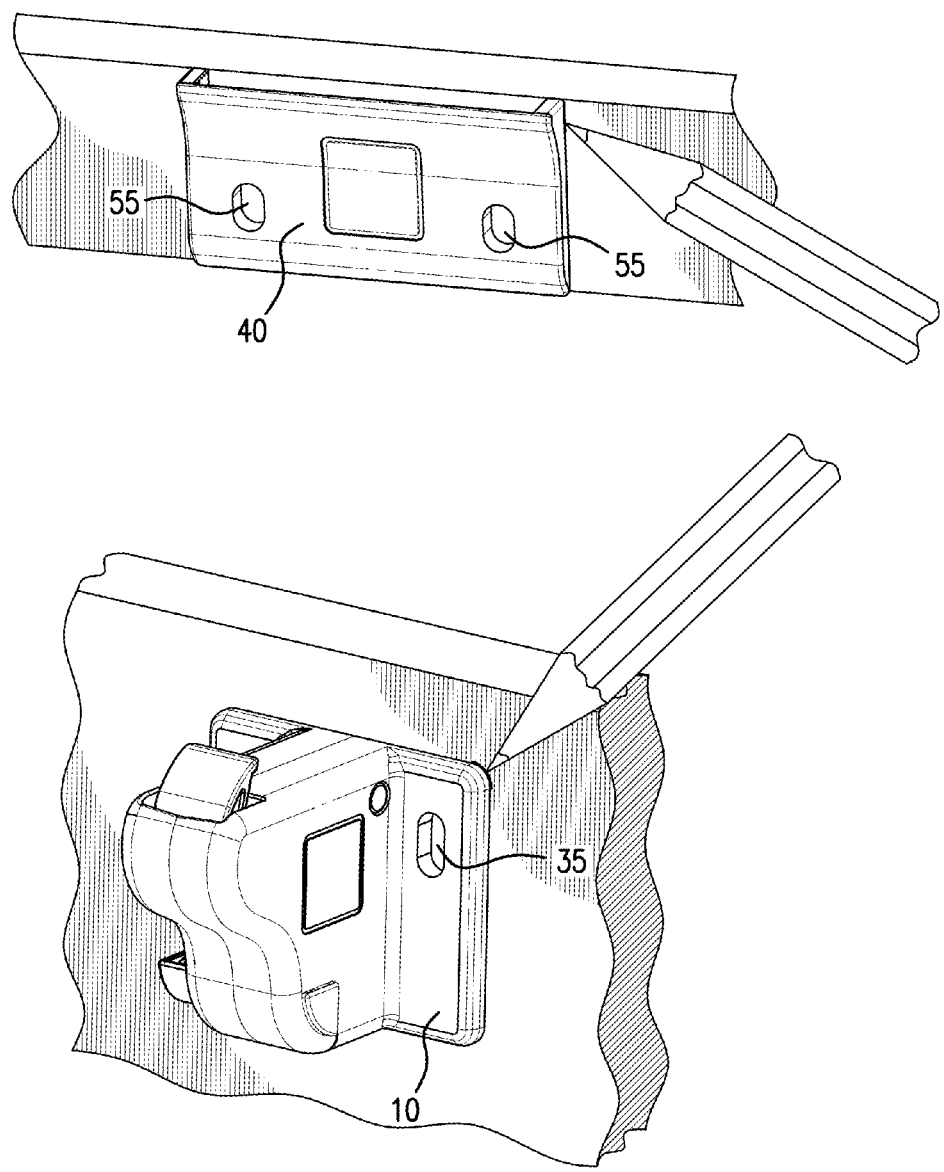
FIG. 4 is a perspective view which illustrates temporary mounting of the catch article and the latch article to surfaces according to certain embodiments of the disclosure.

FIG. 4 is a perspective view which illustrates temporary mounting of the catch article 20 and the latch article 10 to surfaces 70, 75 according to certain embodiments of the disclosure. In FIG. 4, after exposing the low peel strength layer 20, latch 10 may be aligned and marked on surface 70 and similarly after exposing the low peel strength layer 50, catch 40 may be aligned and marked on surface 75 as shown. If any realignment is needed latch 10 and catch 40 may be easily removed via the low peel strength layers 20, 50 and reapplied then remarked for final mounting of the article using the Stronger Tape.

Figure 5:
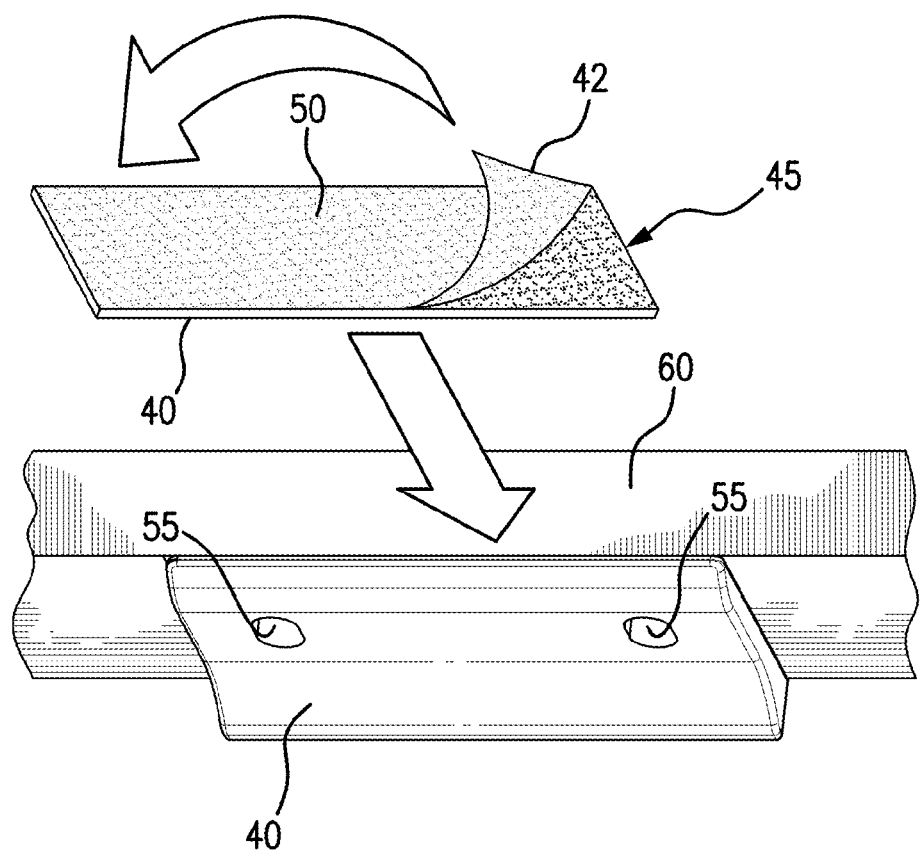
FIG. 5 is a perspective view of the catch article illustrating the removal of a release layer of a second dual-adhesive adhesive tape according to certain embodiments of the disclosure.

FIG. 5 is a perspective view of the catch article 40 illustrating the removal of release layer 42 of the high peel strength tape 45 according to certain embodiments of the disclosure. In FIG. 5, release layer 42 is removed along with the remaining low peel strength tape layer 50 to expose the high peel strength layer 45. Now the catch 40 may be easily and accurately aligned at the marked location on surface 75 and mounted thereon.

Figure 6:
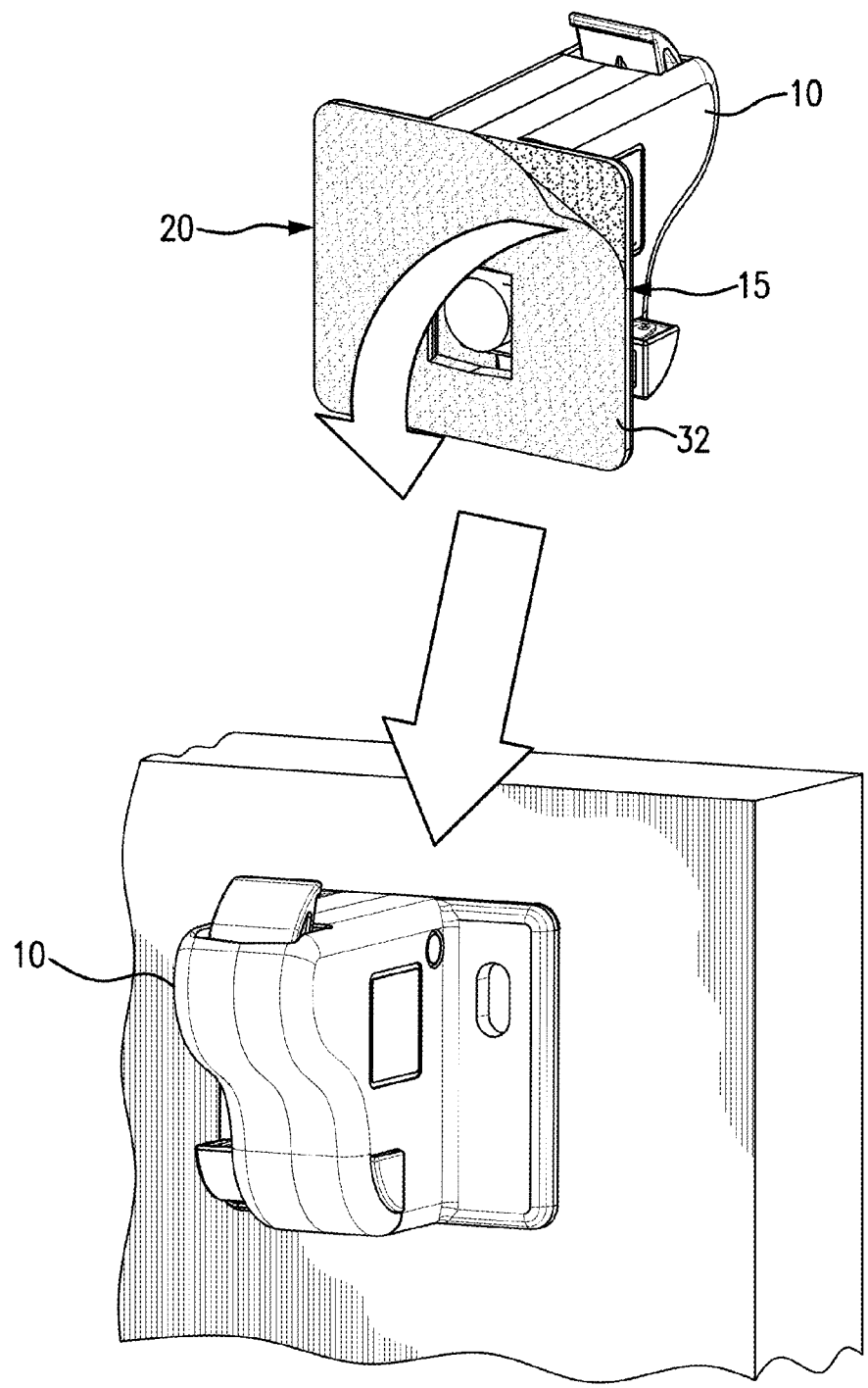
FIG. 6 is a perspective view of the latch article illustrating the removal of a release layer of a second dual-adhesive adhesive tape according to certain embodiments of the disclosure.

FIG. 6 is a perspective view of the latch article 10 illustrating the removal of a release layer 32 of the high peel strength tape 15 according to certain embodiments of the disclosure. In FIG. 6, release layer 32 is removed along with the remaining low peel strength tape layer 20 to expose the high peel strength layer 15. Now the latch 10 may be easily and accurately aligned at the marked location on surface 75 and mounted thereon.

Figure 7:
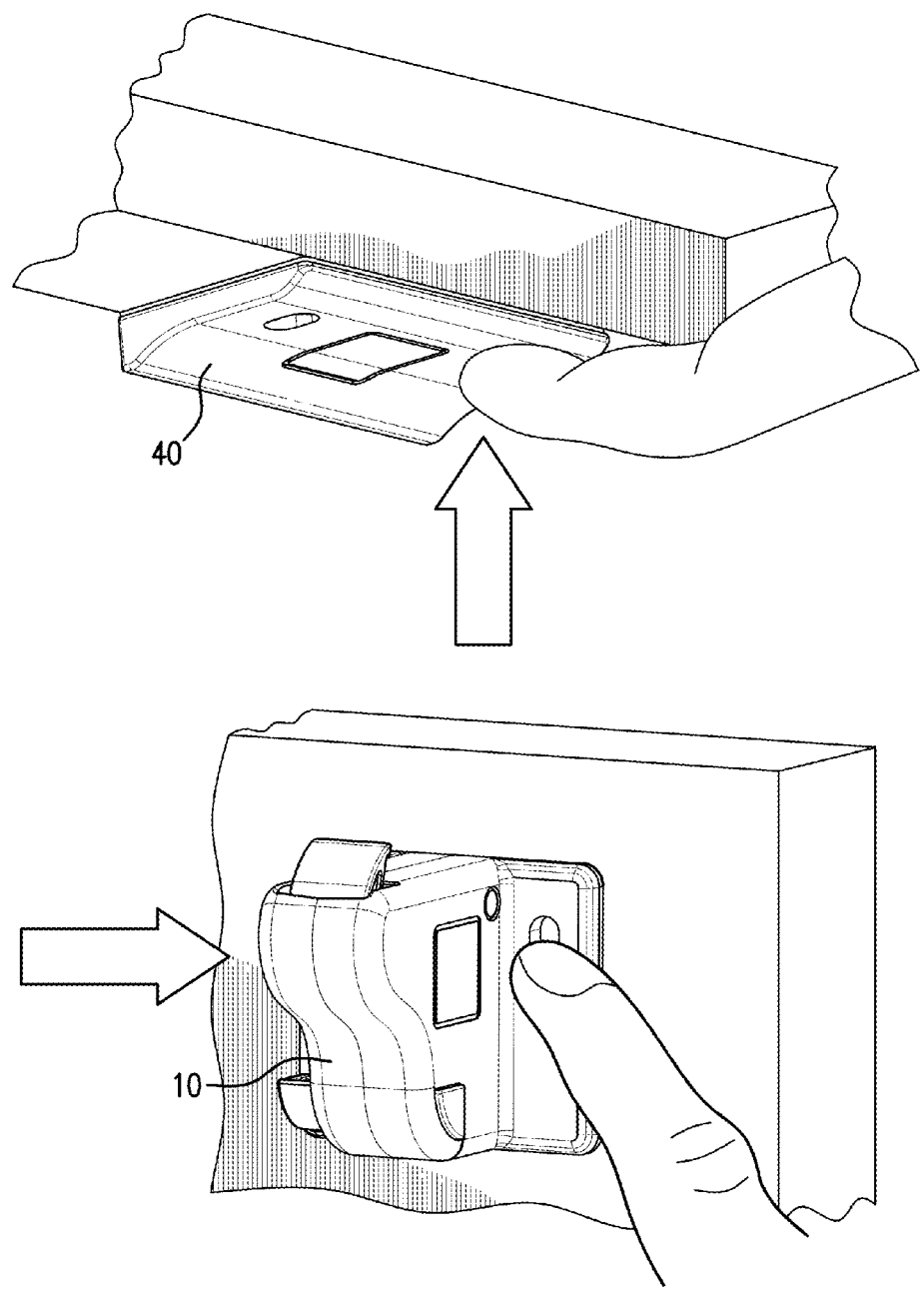
FIG. 7 is a perspective view illustrating mounting the latch and catch articles via the exposed second adhesive tapes to surfaces according to certain embodiments of the disclosure.

FIG. 7 is a perspective view illustrating mounting the latch 10 and catch 40 articles via the exposed high peel strength tapes 15, 45 to surfaces 70, 75 according to certain embodiments of the disclosure. In FIG. 7, latch 10 may be press mounted via the high peel strength tape 15 to surface 70 as shown and catch 40 may be press mounted via the high peel strength tape 45 to surface 75 as shown in alignment to each other.

These articles 10, 40 may include the dual-adhesive double-sided tape preinstalled in order to facilitate the mounting of the articles and the elimination of the dependency on physical templates that were previously required to properly position an article before permanent installation. For this the dual-adhesive tape is cut to size and the back side of the Stronger Tape is secured to the mounting surface if the part. Then all that is needed is to remove the release liner of the Starter Tape and the mounting of the article can begin.

Figure 8:
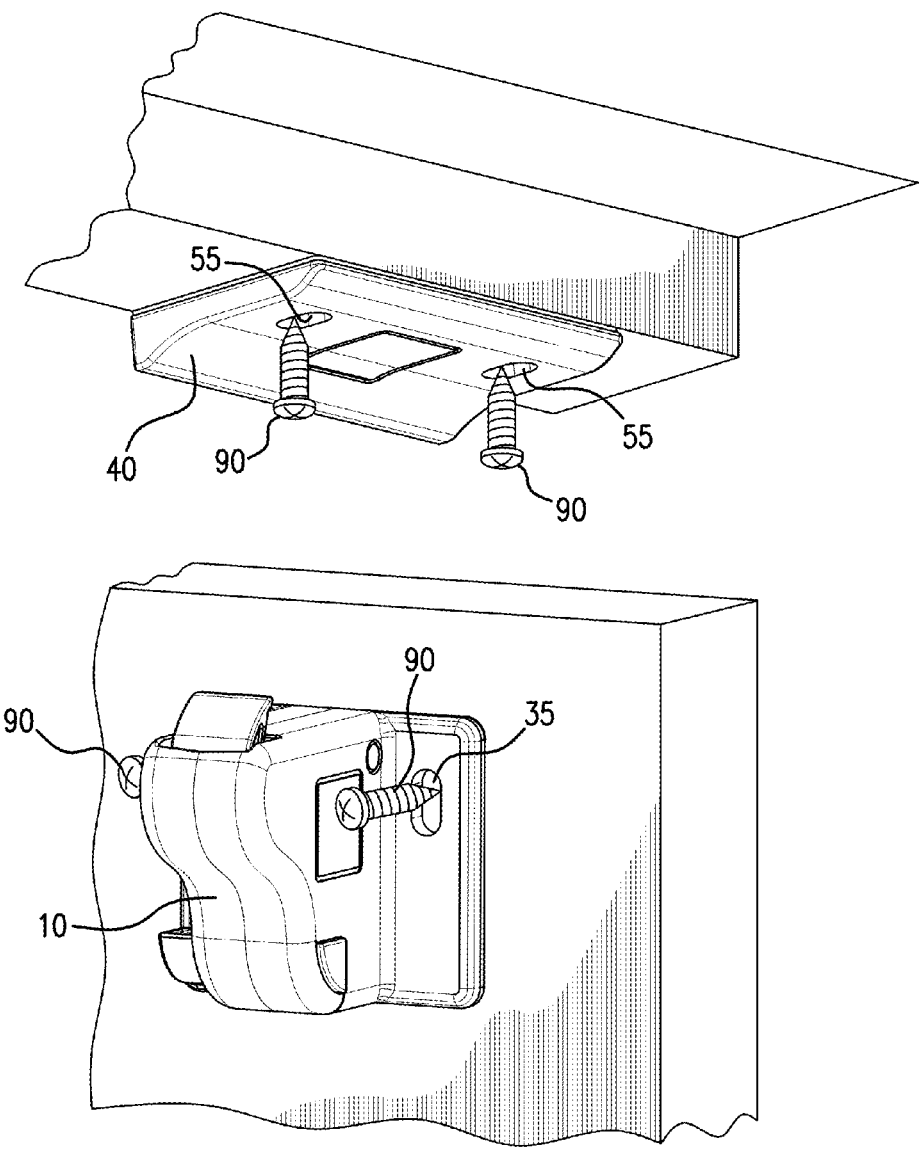
FIG. 8 is a perspective view which illustrates an alternative mounting arrangement using mounting screws in combination with the exposed second adhesive tapes according to certain embodiments of the disclosure.

FIG. 8 is a perspective view which illustrates an alternative mounting arrangement using mounting screws 90, 95 in combination with the exposed high peel strength tapes 15, 45 according to certain embodiments of the disclosure. In FIG. 8, latch 10 may be secured to surface 70 in addition to the high peel strength tape by mounting screws 90. Further, catch 40 may be secured to surface 75 in addition to the high peel strength tape by mounting screws 95. In some embodiments, mounting screws 90 pass through mounting holes 35 in the latch 10 and mounting screws 95 pass through mounting holes 55 in the catch 40. This provides the greatest strength in holding the mounted articles in the desired positions as well as to prevent movement or dislodgement upon use or abuse.

Figure 9:
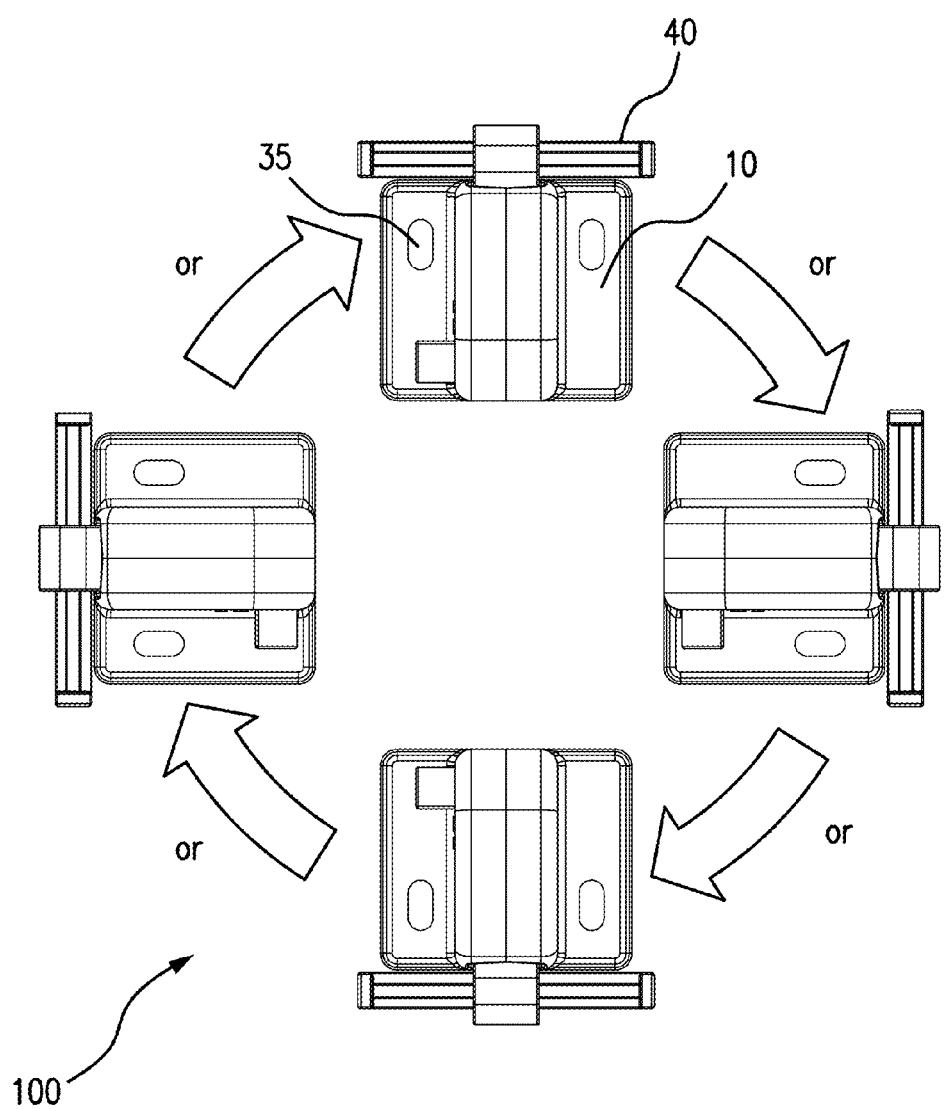
FIG. 9 is a schematic diagram which illustrates alternative mounting positions of the latch and catch articles using the dual-adhesive adhesive tapes according to certain embodiments of the disclosure.

FIG. 9 is a schematic diagram which illustrates alternative mounting positions 100 of the latch 10 and catch 40 articles using the dual-adhesive adhesive tapes 15, 45 according to certain embodiments of the disclosure. In FIG. 9, the combination of the latch 10 and catch 40 is shown in a variety of four alternative mounting positions or orientations 100 depending on the use each on a given surface, such as, a drawer, cabinet or the like. In certain embodiments, the combination of the latch 10 and catch 40 may be mounted in any orientation, upright, upside down, right, left, depending on use.

Figure 10:
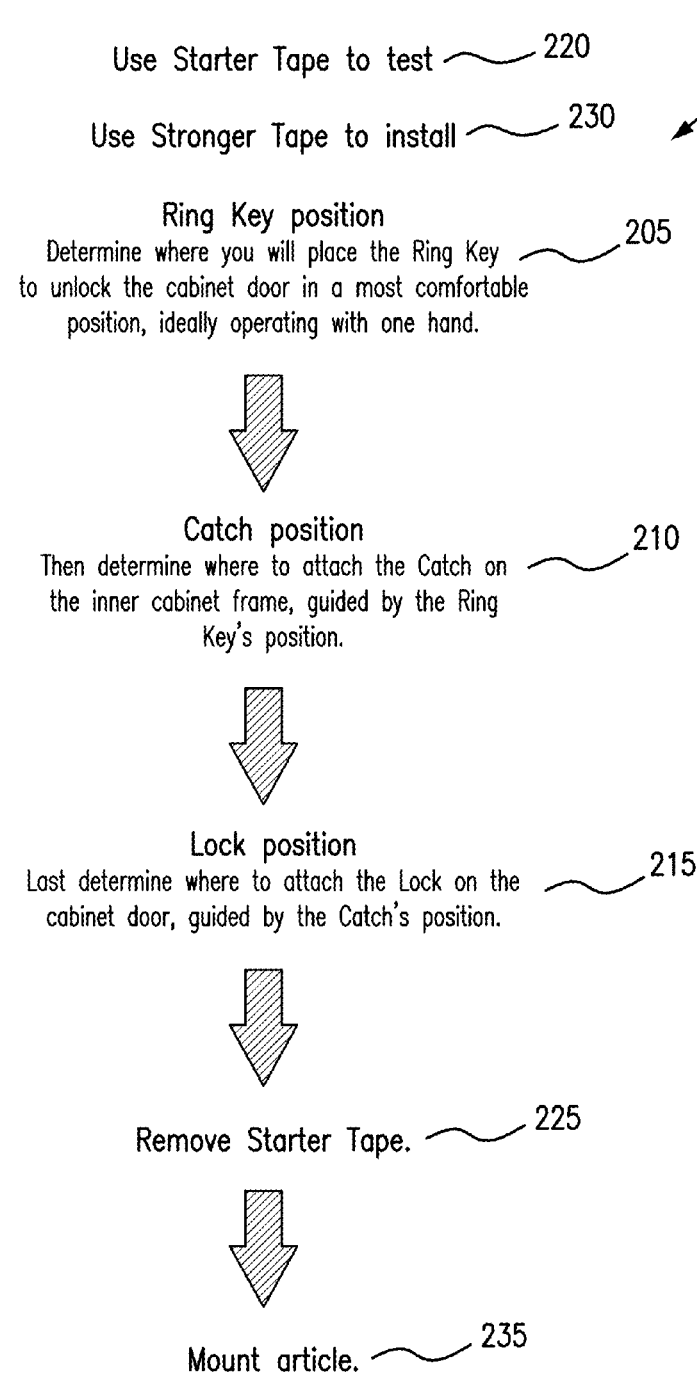
FIG. 10 is a flowchart illustrating a method of mounting articles using the dual-adhesive adhesive tapes according to certain embodiments of the disclosure.

FIG. 10 is a flowchart illustrating a method 200 of mounting an article using the dual-adhesive adhesive tapes according to certain embodiments of the disclosure. In FIG. 10, method 200 may include at 205 positioning and marking a general mounting location on surfaces, 70, 75. At 210, some embodiments include positioning the catch 40 onto surface 75. At 215, some embodiments include positioning the latch 10 onto surface 70. At 220, certain embodiment include applying the low peel strength tapes 20, 50 to temporarily mount the latch 10 and catch 40, respectively, to surfaces 70, 75. At 225, certain embodiments include removing the release layers 33, 43 from the high peel strength tapes 15, 45 and thereby removing the low peel strength tapes 20, 50 from latch 10 and catch 40, respectively. At 230, some embodiments include exposing the high peel strength tapes 15, 45. At 235, some embodiments include mounting the latch 10 and catch 40 to surfaces 70, 75 via the exposed high peel strength tapes, 15, 45.

As discussed above, in certain embodiments, mounting screws may be also used to insure a stronger mounting of latch 10 and catch 40 to surfaces, 70, 75.

Figure 11:
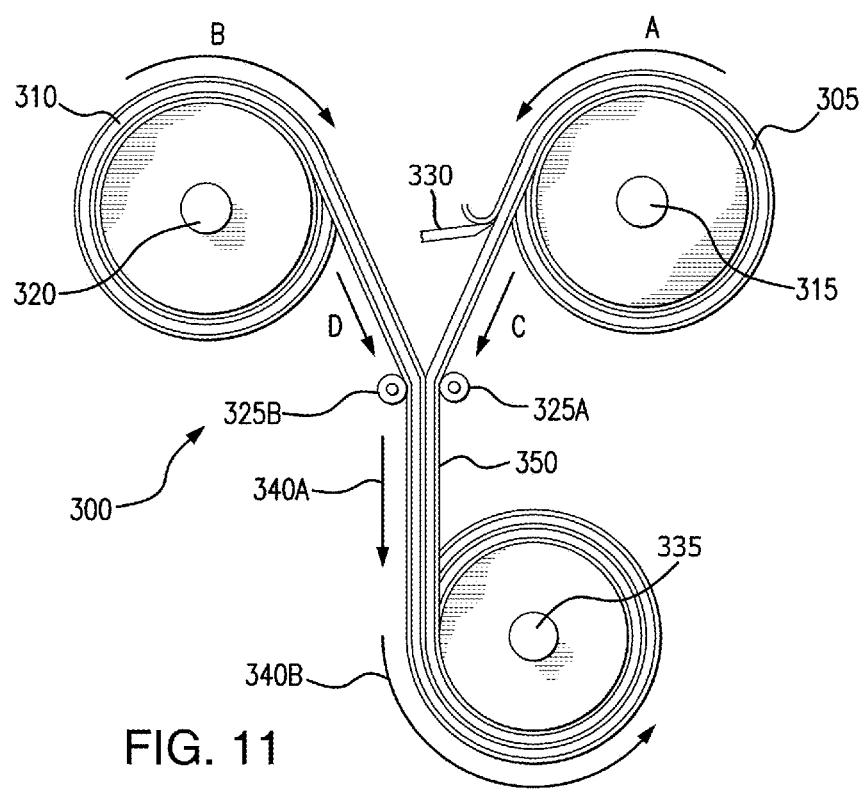
FIG. 11 is a schematic illustration of how to make the dual-adhesive two sided pressure sensitive adhesive tape of the invention.

FIG. 11 schematically illustrates how the dual-adhesive double-sided tape of the invention can be made. An arrangement 300 of two existing double-sided tape rolls can be configured so that one can be joined to the other. In this arrangement 300, tape roll 305 is the first lower strength double-sided Starter Tape while the other tape roll 310 is the Stronger Tape. Each tape roll is mounted on a respective axle 315, 320 and these rotate in opposite directions as shown by arrows A and B.

The rolls 305, 310 are positioned so that the unwinding of tape from the rolls are directed toward each other. This is done by directing each unrolled tape towards a pair of compression rollers 325A, 325B along the paths shown by arrows C and D, respectively. Before tape 305 reaches the compression rollers, one of the backing strips or release liners is removed, e.g., by a blade 330 or other suitable structure, so that the pressure sensitive adhesive is exposed. The removed backing strip can be wound on a separate axle 335. This allows the exposed adhesive of tape 305 to contact the release liner of tape 310 as they pass between the compression rollers 325A, 325B, with the dual-adhesive sided tape 350 created by the bonding of the pressure sensitive adhesive from tape 305 onto the release liner of tape 310. The dual-adhesive double-sided tape 350 passes in the direction of arrows 340A and then 340B and is collected by being wound around axle 345.

In one embodiment, the Starter Tape and Stronger Tape can both be of the same width. For other embodiments, the Starter Tape can be thinner than the Stronger Tape. The reverse is also possible but it generally not necessary. Basically, a sufficient amount of Starter Tape is needed that can temporarily hold the article to be mounted in the correct position. Of course, the relative sizes of the Starter Tape and Stronger Tape would depend upon the size and weight of the article to be mounted. Routine tests can be conducted if necessary to define the correct size and amount of Starter Tape to be combined with the Stronger Tape.

Figure 12:
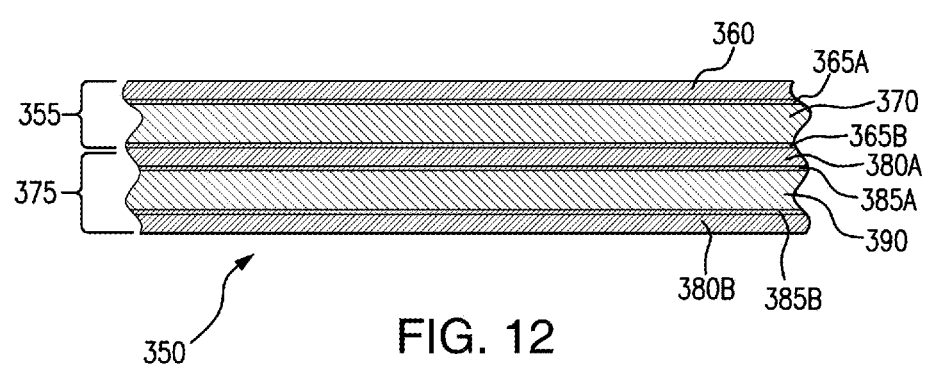
FIG. 12 is a cross-sectional view of the dual-adhesive two sided pressure sensitive adhesive tape of FIG. 11.

A cross-section of the dual-adhesive double-sided tape 350 is illustrated in FIG. 12. This dual-adhesive tape 350 is composed of the first, weaker Starter Tape 355 and the second, permanent Stronger Tape 375. The Starter Tape 355 includes a backing layer 360, and a core 370 with the core preferably surrounded by two pressure sensitive adhesive layers 365A, 365B. The Stronger Tape 375 is composed of backing layers 380A, 380B, support core 390 and pressure sensitive adhesive layers 385A, 385B.

The dual-adhesive double-sided adhesive tape 350 can be provided to either the customer or to the manufacture of the component parts that needs to be mounted. If provided to a customer, the dual tape is cut to the necessary size to cover the surface area of the part that is to be attached to a surface or substrate. When the part is ready to be mounted, the backing layer 360 is removed and the pressure sensitive adhesive of the Starter Tape is used to temporarily mount the article as noted herein. Once the desired location is achieved and marked, the part is removed and the backing 380A is removed to expose the stronger pressure sensitive adhesive 385A of the second or Stronger Tape.

The articles to be mounted can be provided with the tape 350 pre-applied. For this, the tape is first cut to the desired shape and pressure sensitive liner 380B is removed to attach the tape 350 to the article via pressure sensitive adhesive 385B. Then, to mount the article, release layer or backing 360 is removed from tape 355 and the temporary mounting is conducted as noted herein.

And instead of making the dual-adhesive double-sided pressure sensitive adhesive tape shown in FIGS. 11 and 12, it is possible to prepare articles to be mounted by using two separate double-sided pressure sensitive tapes 305, 310. Each tape is cut to the desired size to be attached onto the article to be mounted. First, tape 310 is applied by removing one of the protective backing layers and attaching that tape through the exposed pressure sensitive adhesive to the article. Next, tape 305 is cut to the desired size, which can be the same or smaller than the size of the cut tape 310 that is already attached to the article. Typically, tape 305 covers approximately 40 to 100% of the area of tape 310 depending upon the size and weight of the article to be mounted. Next, the backing on one side of tape 305 is removed and it is attached in the proper position onto the exposed backing layer of tape 310.

Thereafter, when the article is to be mounted on a surface or substrate, the exposed backing layer of tape 305 is first removed to allow temporary mounting of the part followed by the removal of the backing layer of tape 310 so that the article can be permanently mounted in the desired position.

EXAMPLE

A detailed description of installation instructions for a particular product can be found in the pages of Appendix A attached hereto and made a part hereof. This is for the installation of a magnetic cabinet locking mechanism of the type illustrated in U.S. provisional patent application No. 62/528,262 filed Jul. 3, 2017, the entire content of which is expressly incorporated herein to the extent necessary to understand the operation of the components of that mechanism.

This example is an illustration of the installation of a catch and lock mechanism for a cabinet door to prevent access into the cabinet by children. The lock includes a magnet which urges the hook into contact with a catch to prevent the cabinet door from being opened, but the lock can be disengaged by the use of a magnetic ring key. The lock hook or tab engages the catch that is mounted on the structure of the cabinet other than the door. When properly aligned, the lock engages the catch when the doors closed. To open the door, the ring is used to apply a magnetic force that moves the hook or tab out of an interference position with the catch so that the door can be opened. Such an arrangement requires a somewhat precise alignment of the lock and catch for proper operation in maintaining the door closed as well as to allow the lock to be disengaged when access to the cabinet is desired.

Both the lock and the catch are provided with a dual-adhesive double-sided pressure sensitive adhesive tape according to the invention. The tape is cut to the approximate sizes to fit the surface of the lock and the catch. The second side of the second tape is typically provided attached to the surface of the respective lock and catch although if desired, the dual-adhesive two-sided tape can be provided separately and attached to the lock and catch prior to installation. The locations of the lock and catch can vary so long as they are in sufficient proximity for the hook or tab of the lock to engage the catch when the door is closed to prevent unintended opening.

First, a position of where to install the lock is estimated on a cabinet door. The magnetic ring can be used to determine where best to install the catch. Using one hand, it is possible to hold the ring key and the door handle to estimate the position of the catch. The position of the ring may be marked on the cabinet or door with a pencil to guide where the lock and catch need to be mounted as well as to select a position where the ring key will need to be placed to unlock the lock.

The release layer or liner on the Starter Tape (the first double-sided tape) on the catch is removed to expose the weaker adhesive on the first side of that tape. The catch can then be aligned and attached to a position where it would be operatively associated with the lock. As the Starter Tape is only used for temporary attachment, it does not adhere strongly to the position or location where the catch is initially attached. Next the release liner or backing is removed from the Starter Tape and the lock is temporarily mounted onto the cabinet door in a position where it can engage the catch when the door is closed. The temporary installation is tested to make sure that it is in a proper and operative position. If the lock does not function properly, either the catch or lock can be moved to a different position so that they properly cooperate to lock the door when the door is closed.

After the correct positions are determined for the lock and catch, the location of the catch and lock are outlined with a marking, such as a pencil mark, to show where the final mounting positions will be. Thereafter, the release liner or backing of the Stronger Tape (the second double-sided tape) is then removed to expose the stronger adhesive. The removal of the release liner also removes the Starter Tape that is attached to it. The exposed stronger adhesive of the second tape on the catch and lock can then contact the surfaces of the final mounting positions to attach the catch and lock. This assures that the lock and catch are securely attached in the correct mounting positions for proper orientation and operation of the locking mechanism. If desired a separate mark can be made to indicate where to place the ring key to unlock the door.

The detailed description of the preferred embodiments contained herein is intended in no way to limit the scope of the invention. Also, the preferred embodiments described above are not mutually exclusive of one another. As will be apparent to a person of ordinary skill in the art, various other modifications and adaptions of the structure above described are possible without departure from the spirit and scope of the invention; the scope of which is defined in the appended claims.

What is claimed is:

1. A dual-adhesive double-sided adhesive tape, comprising:
   a first double-sided tape comprising a support that has first and second sides each coated with an adhesive, and with the adhesive on the first side including a release liner; and
   a second double-sided tape comprising a support that has first and second sides each coated with an adhesive, with each adhesive including a release liner and with the adhesive on the second side of the second double-sided tape having (a) an adhesive strength that is greater than that of the adhesive on the first side of the first double-sided tape, (b) a greater amount of adhesive than that of the adhesive on the first side of the first double-sided tape, or (c) a larger area of adhesive coverage than that of the adhesive on the first side of the first double-sided tape;
   wherein the adhesive on the second side of the first double-sided tape is attached to the release liner on the adhesive on the first side of the second double-sided tape.

2. The dual-adhesive double-sided adhesive tape of claim 1, wherein each adhesive on the sides of the second double-sided tape has an adhesive strength that is greater than that of the adhesive on the first side of the first double-sided tape.

3. The dual-adhesive double-sided adhesive tape of claim 2, wherein the adhesives on each side of the second double-sided tape are the same pressure sensitive adhesives having the same adhesive strength.

4. The dual-adhesive double-sided adhesive tape of claim 1, wherein the adhesive on the second side of the first double-sided tape has an adhesive strength that is greater than the adhesive on the first side of the first double-sided tape.

5. The dual-adhesive double-sided adhesive tape of claim 4, wherein the adhesives of the first and second tapes are pressure sensitive adhesives and the adhesive strength of the adhesive on the second side of the second double-sided tape is greater by at least 20% as measured by surface energy compared to that of the adhesive on the first side of the first double-sided tape.

6. The dual-adhesive double-sided adhesive tape of claim 1, wherein the adhesive on the second side of the second double-sided tape has a greater amount of adhesive than that of the adhesive on the first side of the first double-sided tape.

7. The dual-adhesive double-sided adhesive tape of claim 1, wherein the adhesive on the second side of the second double-sided tape has a larger area of adhesive coverage than that of the adhesive on the first side of the first double-sided tape.

8. The dual-adhesive double-sided adhesive tape of claim 1, wherein the adhesive on the first side of the first double-sided tape is a silicone adhesive, the adhesive on the second side of the second double-sided tape is an acrylic based adhesive, and the support of the second double-sided tape includes an acrylic foam layer.

9. A method of making dual-adhesive double-sided adhesive tape of claim 1, comprising:

providing a first double-sided tape having a support that has first and second sides each coated with an adhesive, and with the adhesive on the first side including a release liner; and providing a second double-sided tape comprising a support that has a first and second sides each coated with an adhesive, with the adhesive on the first side of the second double-sided tape including a release liner and with the adhesive on the second side of the second double-sided tape having (a) an adhesive strength that is greater than that of the adhesive on the first side of the first double-sided tape, (b) a greater amount of adhesive than that of the adhesive on the first side of the first double-sided tape, or (c) a larger area of adhesive coverage than that of the adhesive on the first side of the first double-sided tape; and adhering the adhesive on the second side of the first double-sided tape to the release liner on the adhesive on the first side of the second double-sided tape.

10. The method of claim 9, wherein each adhesive on the sides of the second double-sided tape has an adhesive strength that is greater than that for the adhesive on the first side of the first double-sided tape.

11. The method of claim 9, wherein the adhesive on the second side of the first double-sided tape has an adhesive strength that is greater than the adhesive on the first side of the first double-sided tape.

12. The method of claim 9, wherein the adhesives on each side of the first double-sided tape are the same and have the same adhesive strength; wherein the adhesives on each side of the second double-sided tape are the same and have the same adhesive strength; and wherein the adhesive strength of the adhesive on the second side of the second double-sided tape is greater by at least 20% as measured by surface energy compared to that of the adhesive on the first side of the first double-sided tape.

13. The method of claim 9, wherein the adhesive on the first side of the first double-sided tape is a silicone adhesive, wherein the adhesive on the second side of the second double-sided tape is an acrylic based adhesive, and wherein the support of the second double-sided tape includes an acrylic foam layer.

14. A method of mounting an article on a working surface with an adhesive wherein the article includes a dual-adhesive double-sided adhesive tape according to claim 1 with the adhesive on the second side of the second double-sided tape attached to a surface of the article, which comprises:

removing the release liner from the adhesive on the first side of the first double-sided tape;

temporarily mounting the article on a placement location on the working surface by contacting the working surface with the adhesive on the first side of the first double-sided tape;

marking a desired mounting location for the article based on the temporary mounting of the article;

removing the release liner and first double-sided tape from the adhesive on the first side of the second double-sided tape; and mounting the article in the desired mounting location by contacting that location with the adhesive on the first side of the second double-sided tape.

15. The method of claim 14, wherein the adhesive on the first side of the first tape has sufficient adhesiveness to allow multiple mountings without leaving a residue on the surface or substrate and without detaching from the second tape.

16. The method of claim 14 wherein the adhesive strength of the adhesive on the second side of the second double-sided tape is greater by at least 20% as measured by surface energy compared to that of the adhesive on the first side of the first double-sided tape.

17. The method of claim 14 wherein the second tape is applied to the article to be mounted prior to attachment of the first tape to the second tape.

18. An article to be mounted on a working surface comprising a body member having a mounting surface;

a first double-sided tape comprising a support that has first and second sides each coated with an adhesive, and with the adhesive on the first side including a release liner; and a second double-sided tape comprising a support that has first and second sides each coated with an adhesive, with the adhesive on the second side of the second double-sided tape having an adhesive strength that is greater than that of the adhesive on the first side of the first double-sided tape;

wherein the second double-sided tape attached to the mounting surface of the body member of the article with the adhesive on the second side of the second double-sided adhesive tape attached to the mounting surface; and wherein the first double-sided tape is attached to the second double-sided tape with the adhesive on the second side of the first double-sided tape attached to the release liner on the adhesive on the first side of the second double-sided tape.

19. The article of claim 18 wherein the adhesives on each side of the first double-sided tape are the same and have the same adhesive strength, wherein the adhesives on each side of the second double-sided tape are the same and have the same adhesive strength, and wherein the adhesive strength of the adhesive on the second side of the second double-sided tape is greater by at least 20% as measured by surface energy compared to that of the adhesive on the first side of the first double-sided tape.

20. The article of claim 18, wherein the adhesive on the first side of the first double-sided tape is a silicone adhesive, wherein the adhesive on the second side of the second double-sided tape is an acrylic based adhesive, and wherein the support of the second double-sided tape includes an acrylic foam layer.

* * * * *